(12) United States Patent
Takeda et al.

(10) Patent No.: US 11,235,690 B2
(45) Date of Patent: Feb. 1, 2022

(54) ARMREST AND VEHICLE SEAT

(71) Applicant: TACHI-S CO., LTD., Tokyo (JP)

(72) Inventors: Masakazu Takeda, Tokyo (JP); Rina Kurosaki, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/923,603

(22) Filed: Jul. 8, 2020

(65) Prior Publication Data

US 2021/0009018 A1 Jan. 14, 2021

(30) Foreign Application Priority Data

Jul. 12, 2019 (JP) .............................. JP2019-130331

(51) Int. Cl.
*B60N 2/75* (2018.01)
*B60N 3/10* (2006.01)
*B60N 2/58* (2006.01)

(52) U.S. Cl.
CPC .............. *B60N 2/757* (2018.02); *B60N 2/58* (2013.01); *B60N 2/793* (2018.02); *B60N 3/102* (2013.01)

(58) Field of Classification Search
CPC .......... B60N 2/757; B60N 2/793; B60N 2/58; B60N 2/75; B60N 2/76; B60N 3/102; B60R 2011/0014
USPC .................................................. 297/188.14
See application file for complete search history.

(56) References Cited

U.S. PATENT DOCUMENTS

| | | | | |
|---|---|---|---|---|
| 5,246,269 A * | 9/1993 | DeBoer | ..................... | B60N 2/70 297/227 |
| 5,284,314 A * | 2/1994 | Misaras | ................. | B60N 3/102 248/311.2 |
| 5,372,403 A * | 12/1994 | Puerto | ...................... | A47C 1/03 297/188.17 |
| 5,524,958 A * | 6/1996 | Wieczorek | ............. | B60N 3/102 297/188.17 |
| 8,696,058 B2 * | 4/2014 | Uwague-Igharo | ..... | B60N 2/757 297/188.17 |
| 8,911,011 B2 * | 12/2014 | Andersson | ............. | B60N 2/757 297/188.14 |
| 9,102,277 B2 * | 8/2015 | Okuhara | ................. | B60R 7/043 |
| 2007/0262632 A1 * | 11/2007 | Cody | ..................... | B60N 2/773 297/411.35 |
| 2018/0154815 A1 * | 6/2018 | Karges | ..................... | B60N 3/10 |
| 2019/0001850 A1 * | 1/2019 | Johnson | ................. | B60N 2/757 |

FOREIGN PATENT DOCUMENTS

JP 2000-238568 A 9/2000

* cited by examiner

*Primary Examiner* — Mark R Wendell
(74) *Attorney, Agent, or Firm* — Paratus Law Group, PLLC

(57) ABSTRACT

An armrest for a vehicle seat that is rotatable with respect to a seat back of the vehicle seat, and the armrest includes a bracket that is configured to support a rotation shaft of the armrest, the hollow plastic shell to which the bracket is joined and a trim cover that covers the hollow plastic shell.

9 Claims, 10 Drawing Sheets

ARMREST AND VEHICLE SEAT

CROSS REFERENCE TO RELATED APPLICATIONS

This application claims priority to Japanese Patent Application No. 2019-130331 filed on Jul. 12, 2019, the content of which is incorporated herein by reference.

BACKGROUND

Field of the Invention

The present invention relates to an armrest and a vehicle seat.

Related Art

The armrest disclosed in JP-2000-238568-A is an armrest of a seat installed in a vehicle such as an automobile, and the armrest can be accommodated in a seat back in a state of being erected and can be used for arm resting in a state of being lay down. The armrest includes a pin serving as a rotation shaft with respect to the seat back and a frame connected with the pin. The frame is covered by foam, and the foam is covered by a cover.

The armrest disclosed in JP-A-2000-238568 includes the frame formed by bending a rod or pipe made of metal such as steel into a substantially rectangular frame shape. The frame is arranged along four side surfaces of the armrest, and provides strength for the armrest. However, the manufacturing cost and weight of the armrest may increase due to the frame made of metal extending over the whole of the armrest.

SUMMARY

Illustrative aspects of the present invention provide a low-cost and lightweight armrest and a vehicle seat with the armrest.

According to an illustrative aspect of the present invention, an armrest that is rotatable with respect to a seat back of a vehicle seat includes: a bracket configured to support a rotation shaft of the armrest; a hollow plastic shell, the bracket being joined to the shell; and a trim cover covering the hollow plastic shell.

According to another illustrative aspect of the present invention, a vehicle seat includes the above-described armrest.

DETAILED DESCRIPTION OF THE EXEMPLARY EMBODIMENTS

Figure 1:
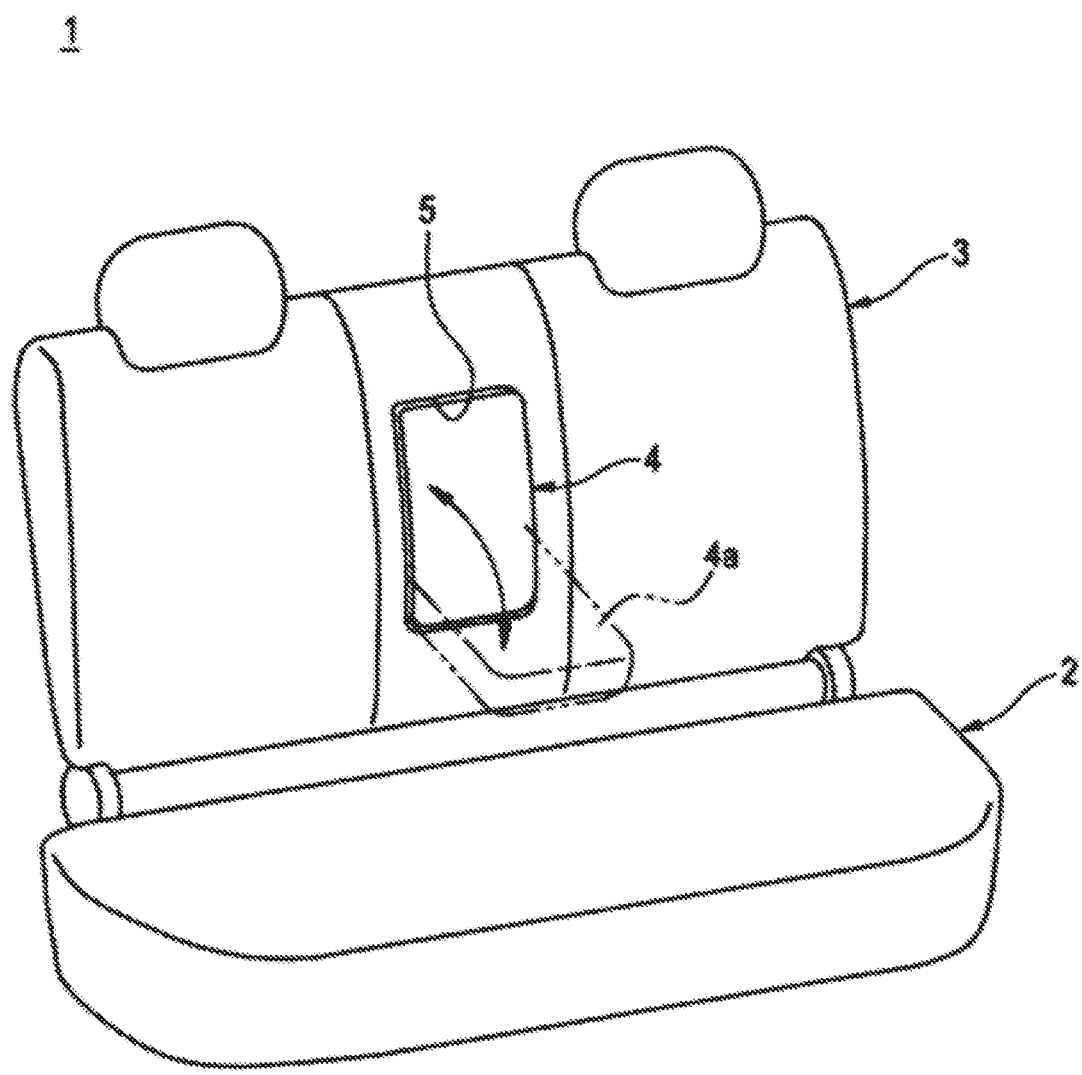
FIG. 1 is a perspective view of a vehicle seat according to an embodiment of the present invention.

FIG. 1 shows a vehicle seat according to an embodiment of the present invention.

The vehicle seat 1 is a seat mounted on a vehicle such as an automobile, and is a seat on which a plurality of occupants can be seated side by side. The seat 1 includes a seat cushion 2 that supports buttocks and thighs of an occupant seated on the seat 1, a seat back 3 that supports a waist and back of an occupant, and an armrest 4.

A recess portion 5 capable of accommodating the armrest 4 is provided at a center of the seat back 3 in a seat width direction. The armrest 4 is rotatably supported by the seat back 3, and the armrest 4 is accommodated in the recess portion 5 in a state where the armrest 4 is erected. The armrest 4 accommodated in the recess portion 5 constitutes a part of the seat back 3 and supports a back of an occupant. Meanwhile, in a state where the armrest 4 is lay down, the armrest 4 is pulled out from the recess portion 5. In the armrest 4 pulled out from the recess portion 5, a placement surface 4a is horizontally arranged, and supports a forearm of an occupant placed on the placement surface 4a.

Figure 2:
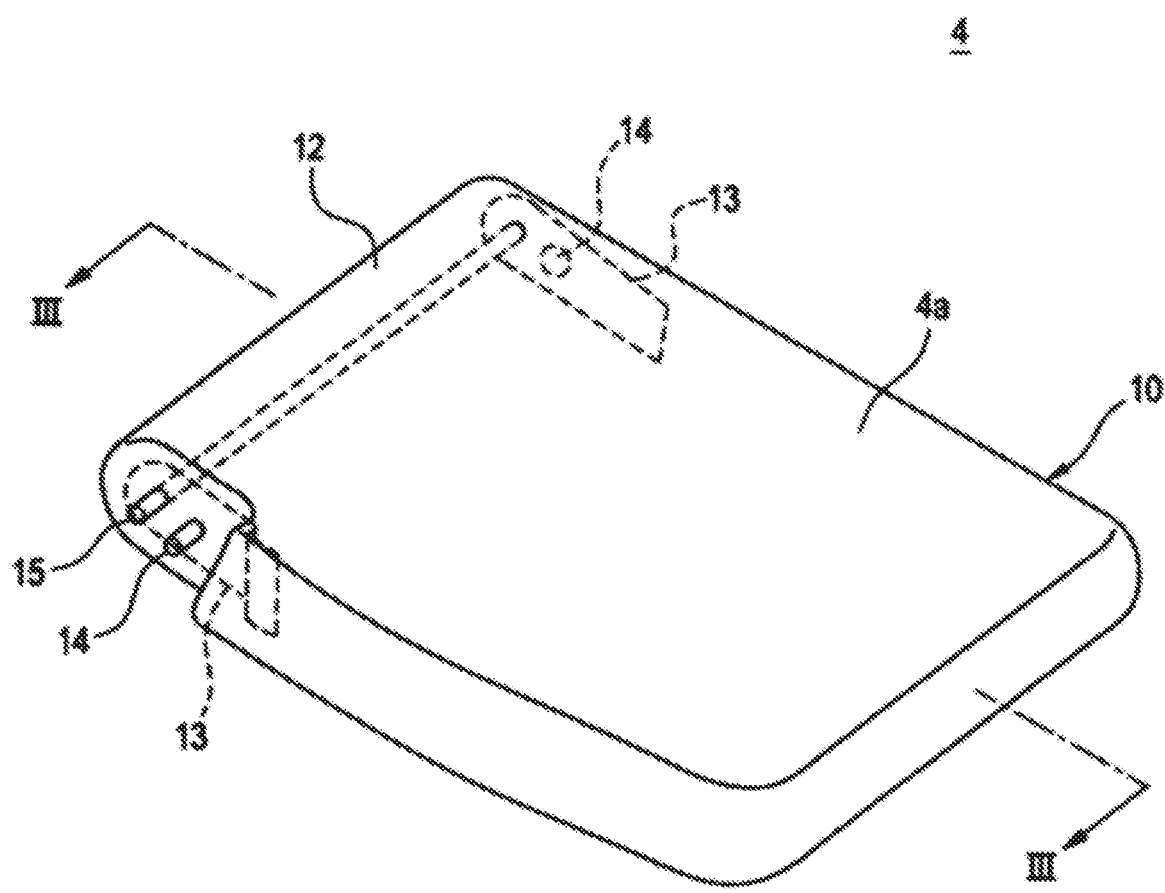
FIG. 2 is a perspective view of an armrest shown in FIG. 1.
Figure 3:
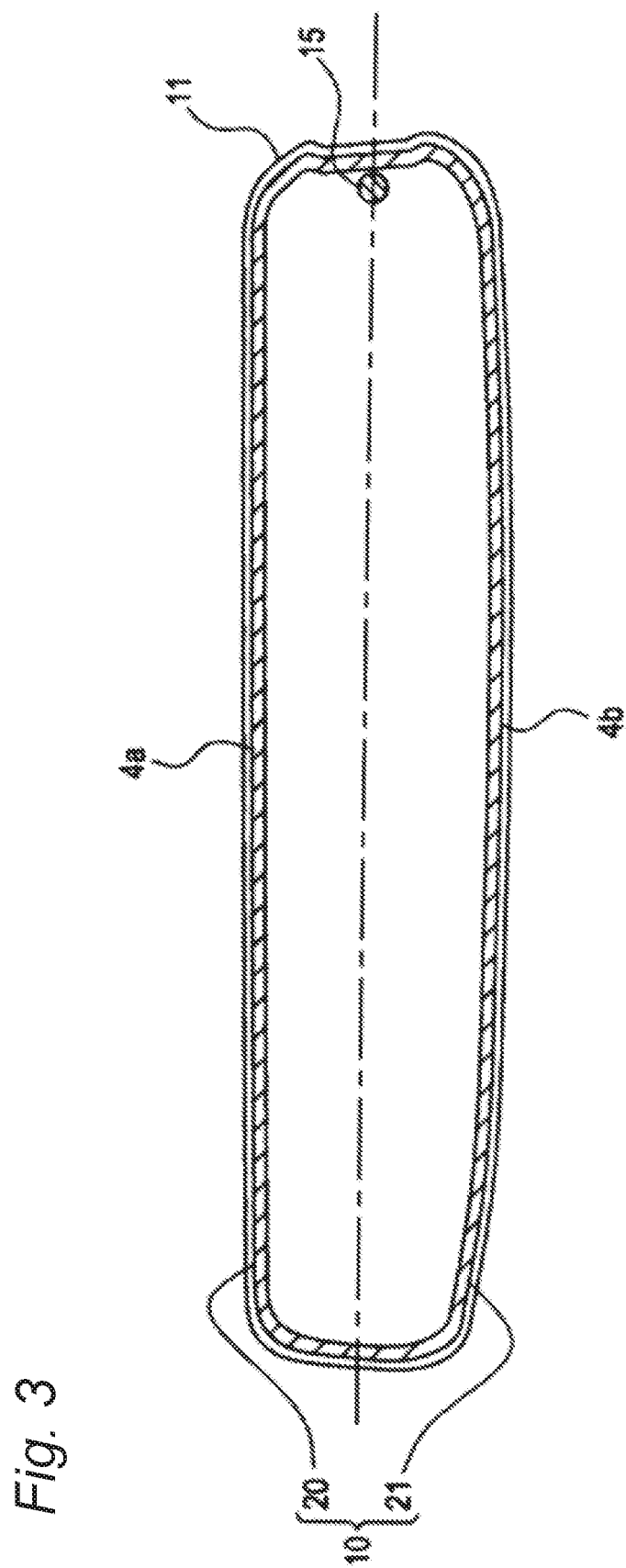
FIG. 3 is a cross-sectional view taken along line III-III in FIG. 2.

FIGS. 2 and 3 show the armrest 4.

The armrest 4 includes a shell 10 and a trim cover 11 that covers the shell 10. The trim cover 11 is made of pieces of cover material, such as leather (natural leather, and synthetic leather), woven fabric, non-woven fabric, or knitted fabric, which are sewn together. The cover material used for the trim cover 11 is commonly the same as a cover material used for a trim cover of the seat back 3, but may also be different therefrom.

The shell 10 is a hollow box body made of plastic. The plastic includes thermosoftening plastic such as polypropylene. One end portion 12 of the shell 10 is disposed on a lower side of the armrest 4 in a state where the armrest 4 is accommodated in the recess portion 5 of the seat back 3 (with reference to FIG. 1), and a pair of brackets 13 are joined to the end portion 12. A method of joining the shell 10 and the brackets 13 includes insert molding or bolt fastening.

The bracket 13 is a plate-shaped member made of metal such as steel, and supports a rotation shaft of the armrest 4. In this example, the bracket 13 has a pin 14 serving as the rotation shaft, but the pin 14 may be provided in the seat back 3. Further, the rotation shaft may be retrofitted to the bracket 13 by a bolt or the like. In a case where the pin 14 is provided in the seat back 3 and in a case where the rotation shaft is retrofitted to the bracket 13 by a bolt or the like, the bracket 13 is provided with a bearing hole for accommodating the pin 14, the bolt, or the like. Further, the bracket 13 also has a stopper shaft 15 for defining a rotation range of the armrest 4.

The shell 10 includes a shell top 20 having the placement surface 4a on which a forearm of an occupant is to be placed, and a shell bottom 21 having a back surface 4b on an opposite side of the armrest 4 from the placement surface 4a, and the shell top 20 and the shell bottom 21 are in one-piece construction. The shell 10, in which the shell top 20 and the shell bottom 21 are in one-piece construction, can be formed by blow molding, for example.

Figure 4:
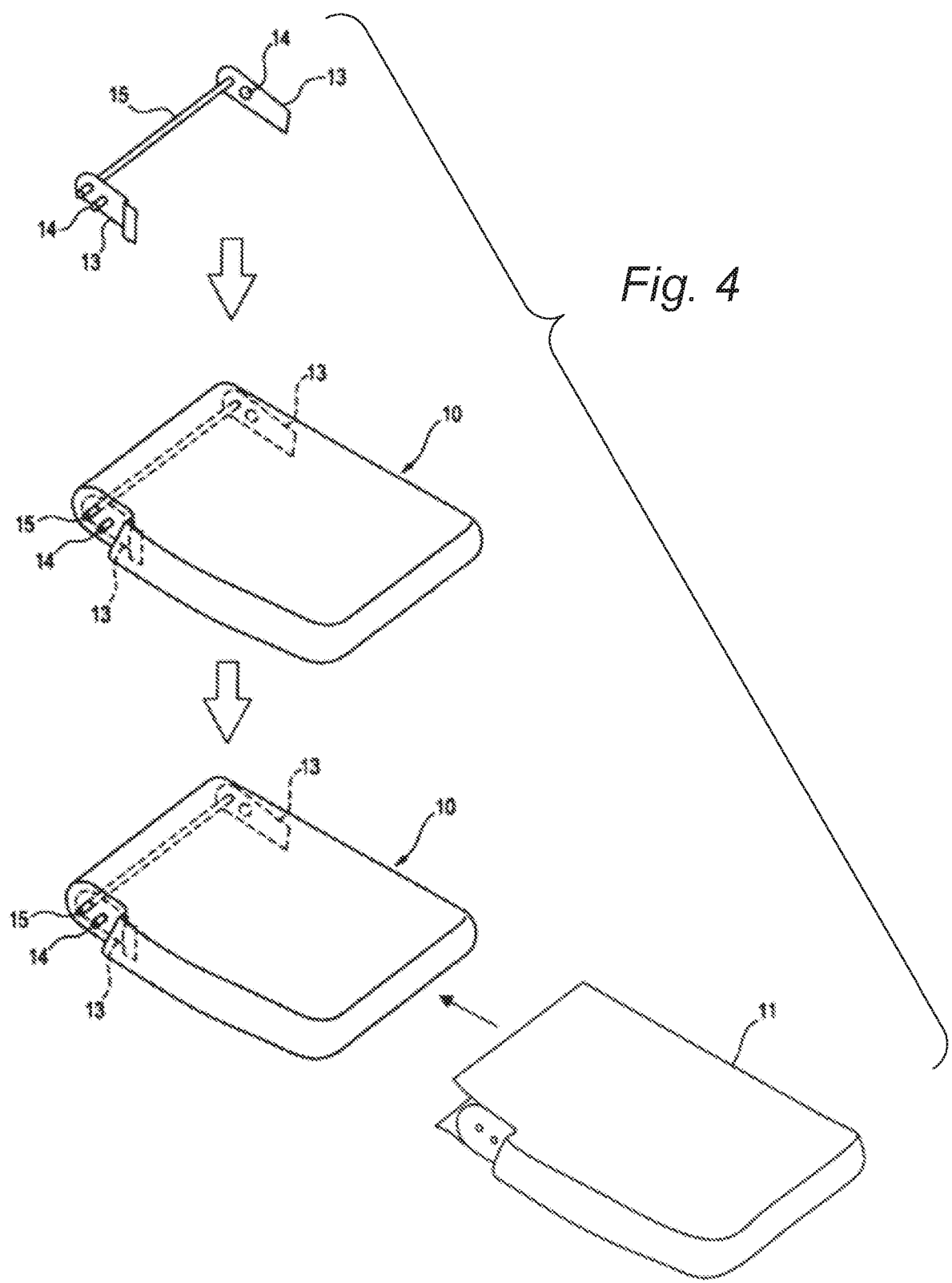
FIG. 4 is a schematic view illustrating a manufacturing process of the armrest shown in FIG. 2.
Figure 5:
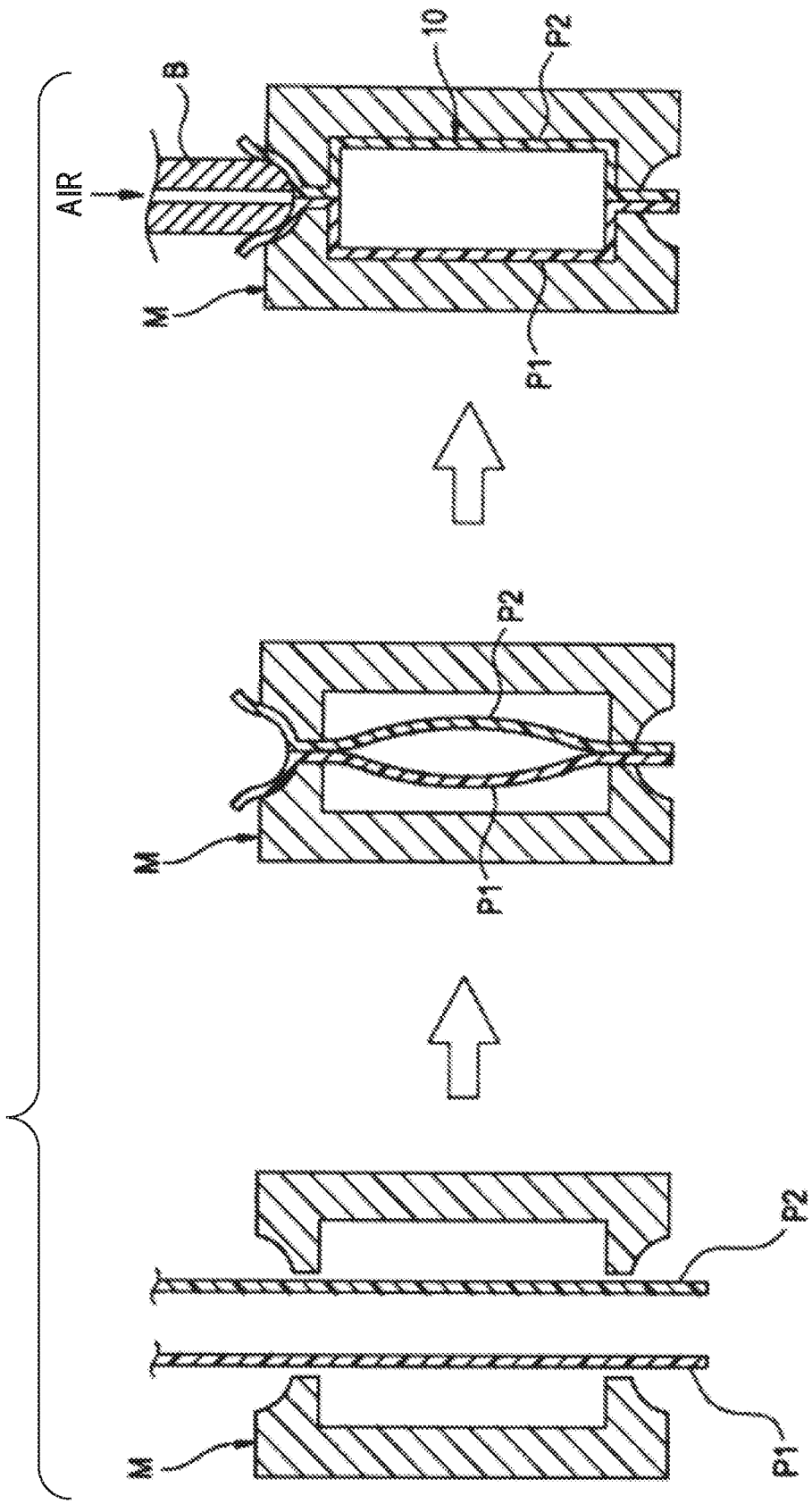
FIG. 5 is a schematic view illustrating a shell forming step in the manufacturing process shown in FIG. 4.

FIGS. 4 and 5 show a manufacturing process of the armrest 4.

In the example shown in FIG. 4, the bracket 13 is inserted into the shell 10. First, an assembly of the brackets 13, the pins 14, and the stopper shaft 15 is prepared, and this assembly is installed in a mold used for blow molding of the shell 10. Next, plastic material for the shell 10 is placed in the mold, and the plastic material is blow molded. By blow molding, the shell 10 is formed integrally with the assembly including the brackets 13. Then, the trim cover 11 is put on the shell 10. A tension is applied to the trim cover 11 that covers the shell 10 to prevent slack and wrinkles of the trim cover 11.

In blow molding, the plastic material is commonly extruded into a cylindrical shape from a head. The extruded plastic material is also referred to as a parison. Along with the mold closing, an upper end and a lower end of the tubular parison are welded. Thereafter, air is blown into an interior of the parison through a blow pin B. and the parison is pressed against the mold M due to a pressure of the air. Thus, the hollow shell 10, in which the shell top 20 and the shell bottom 21 are in one-piece construction, is obtained.

The shape of the parison is not limited to the cylindrical shape. As shown in FIG. 5, two parisons P1, P2 extruded into a sheet shape may be combined. Along with the mold closing, upper and lower ends and pairs of side edges of the two parisons P1, P2 are welded, and a space is enclosed between the two parisons P1, P2. Thereafter, air is blown into the space enclosed by the two parisons P1, P2 and the parisons P1, P2 are pressed against the mold M due to a pressure of the air. Thus, the hollow shell 10, in which the shell top 20 and the shell bottom 21 are in one-piece construction, is obtained.

Unlike foam such as flexible urethane foam, which is widely used in a cushion pad, the shell 10 made of the plastic material has rigidity capable of supporting the back or forearm of an occupant in the shell itself. Therefore, the shell 10 eliminate the need for a reinforcing frame extending over the entire shell, and just has the plate-shaped bracket 13, supporting the pin 14 serving as the rotation shaft, joined to the one end portion 12 of the shell 10. This reduces the cost and weight of the armrest 4. Further, although a compressive force acts on the shell 10 covered with the trim cover 11, the shell 10 made of the plastic material is harder and more robust to compression than a mass of foam such as flexible urethane foam. The hardness and robustness of the shell increases the reproducibility of the shape of the armrest 4.

Moderate flexibility (cushioning property) is also required for the shell 10 supporting a back or forearm of an occupant. The flexibility of the shell 10 may be tuned by the thickness and/or material. Here, as shown in FIG. 5, when the shell 10 is formed using the two parisons P1, P2, the thicknesses and/or materials of the parisons P1, P2 may be the same or different. Forming the shell top 20 with the parison P1, forming the shell bottom 21 with the parison P2 and making the thicknesses and/or materials of the parisons P1, P2 different allows different tuning between the shell top 20 and the shell bottom 21.

For example, the shell top 20 on which a forearm of an occupant is to be placed in a state where the armrest 4 is pulled out from the seat back 3 can be tuned relatively hard to bent, and the shell bottom 21 that supports a back of an occupant in a state where the armrest 4 is accommodated in the seat back 3 can be tuned relatively easy to bent. In this case, the thickness of the parison P1 forming the shell top 20 is relatively large, and/or rigidity of the material of the parison P1 is relatively high.

Figure 6:
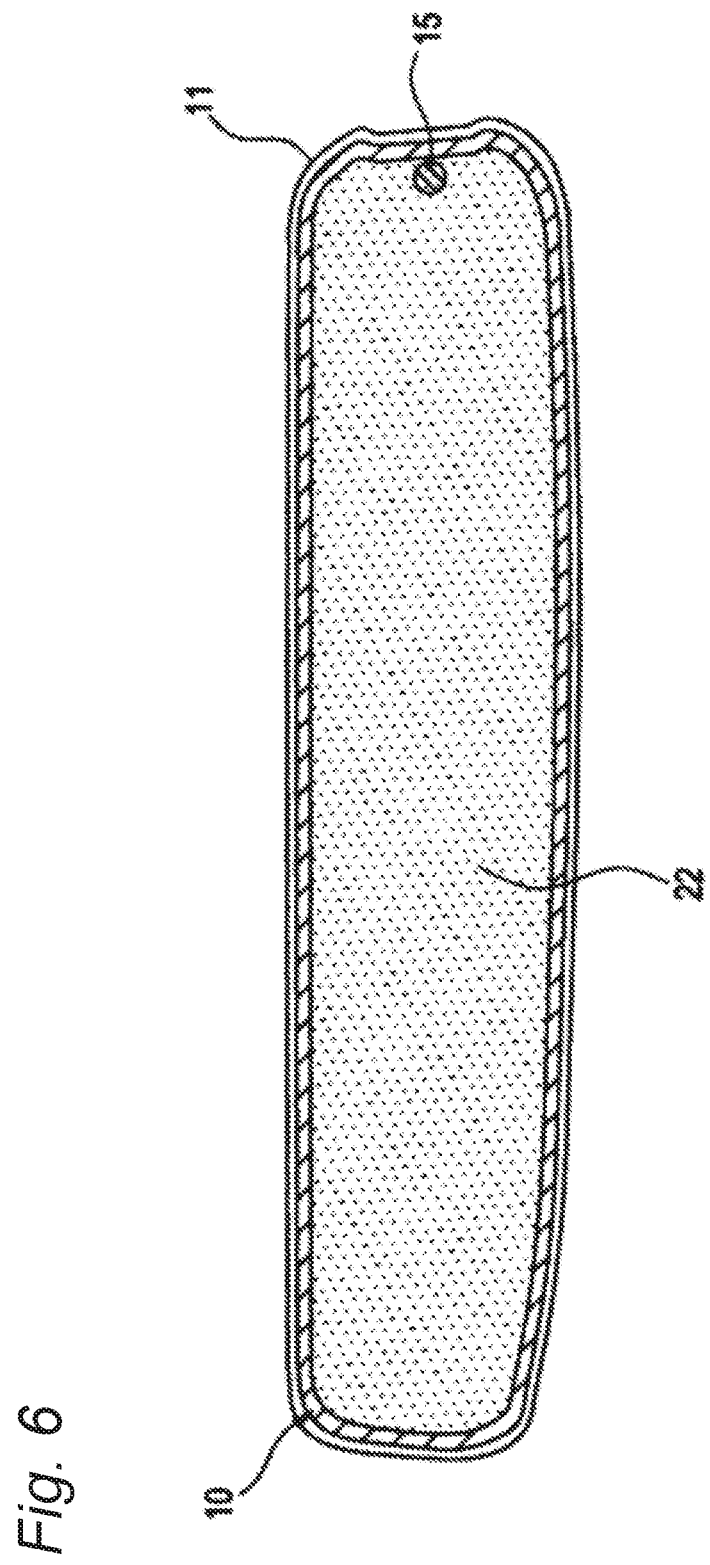
FIG. 6 is a cross-sectional view of an armrest according to another embodiment of the present invention.

In order to tune the flexibility of the shell 10, as shown in FIG. 6, a core 22 may be disposed in the hollow shell 10. The core 22 is made of, for example, foam such as flexible urethane foam. In a case where the core 22 is made of foam, in the blow molding described above, foaming material is injected instead of the air, and the foaming material foams in the interior of the parison. The parison is pressed against the mold by a foaming pressure. Or, after the blow molding of the shell 10, the foaming material may be separately injected into the hollow shell 10 and foam in the interior of the shell 10.

Figure 7:
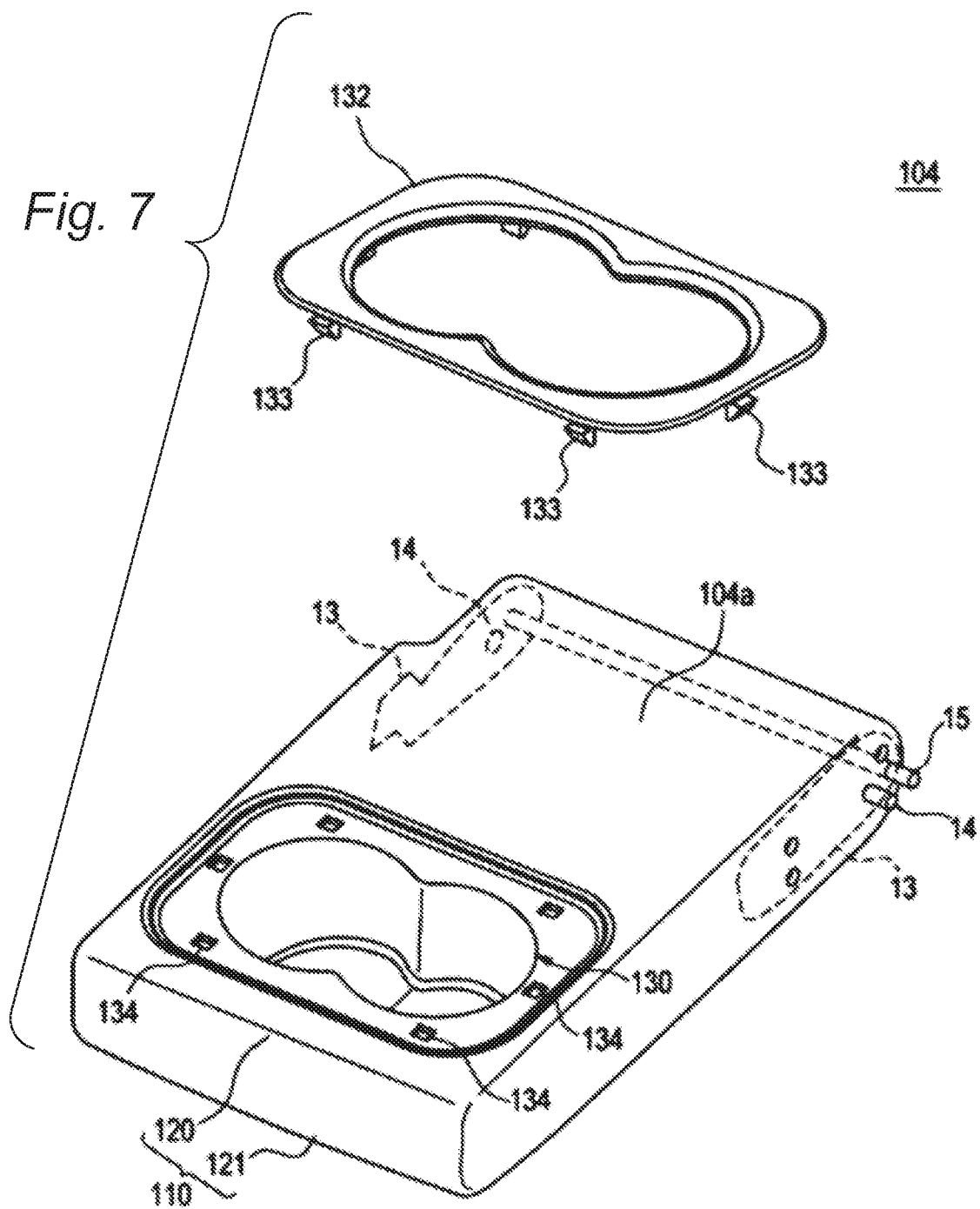
FIG. 7 is a perspective view of an armrest according to still another embodiment of the present invention.
Figure 8:
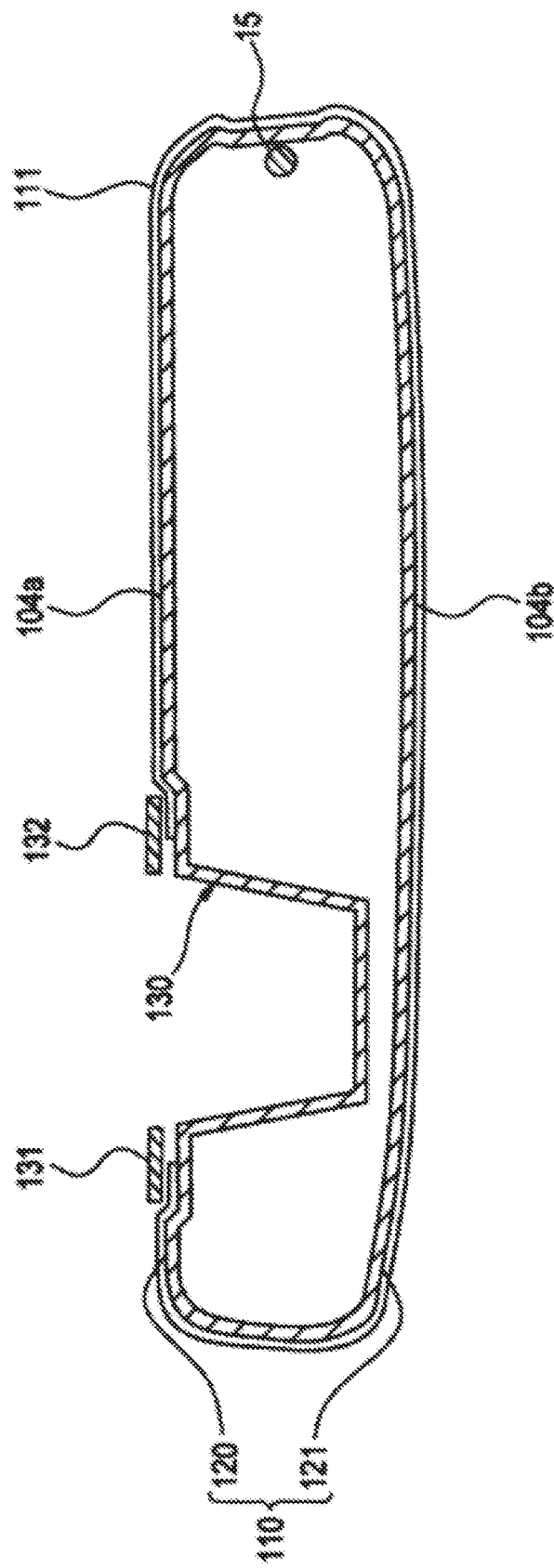
FIG. 8 is a cross-sectional view of the armrest shown in FIG. 7.

FIGS. 7 and 8 show an armrest according to another embodiment of the present invention.

An armrest 104 shown in FIGS. 7 and 8 includes a hollow shell 110 made of plastic, and a trim cover 111 that covers the shell 110. Brackets 13 each of which supports the pin 14 serving as a rotation shaft of the armrest 104 are joined to one end portion of the shell 110. The shell 110 includes a shell top 120 that has a placement surface 104a on which a forearm of an occupant is to be placed, and a shell bottom 121 that has a back surface 104b on an opposite side of the shell 110 from the placement surface 104a, and the shell top 120 and the shell bottom 121 are in one-piece construction.

The armrest 104 further includes a recess-shaped cup holder 130 that opens on the placement surface 104a. The cup holder 130 can hold not only a beverage container such as a cup but also various items such as a smartphone. The shell 110 (the shell top 120) including the cup holder 130 has one-piece construction. In the blow molding described above, the mold has a protruding portion and the parison is pressed against the protruding portion, thus the cup holder 130 is integrally formed with the shell 110.

The trim cover 111 has an opening 131 from which the cup holder 130 is to be exposed. An edge portion of the trim cover 111 appearing at the opening 131 is sandwiched between the shell 110 and a frame-shaped escutcheon 132 mounted on the shell 110, and is covered by the escutcheon 132. By engaging a plurality of locking claws 133 provided on a back surface of the escutcheon 132 and a plurality of locking holes 134 provided in the shell 110, the escutcheon 132 is mounted to the shell 110.

In a related-art armrest in which a frame is covered by a mass of foam, a cup holder is fixed to the frame by crushing a part of the mass of foam, and a bracket or the like for fixing the cup holder is joined to the frame formed by bending a rod or pipe member into a frame shape. Meanwhile, in the armrest 104, the cup holder 130 integrated with the shell eliminates a fixing member such as a bracket, thus reducing the cost. Further, the escutcheon 132 fixed to an exposed surface of the shell 110 is easy to mount as compared with the related-art cup holder that crushes a part of the mass of foam and is fixed to the frame.

Further, in the related-art armrest, the cup holder is a plastic molded article having a recess portion for accommodating a cup or the like and a flange portion for covering an edge portion of the trim cover. Meanwhile, in the armrest 104, the cup holder 130 and the escutcheon 132 are separated from each other. This allows the armrest 104 to be decorated with the escutcheon 132 that is different from the cup holder 130 in material.

Figure 9:
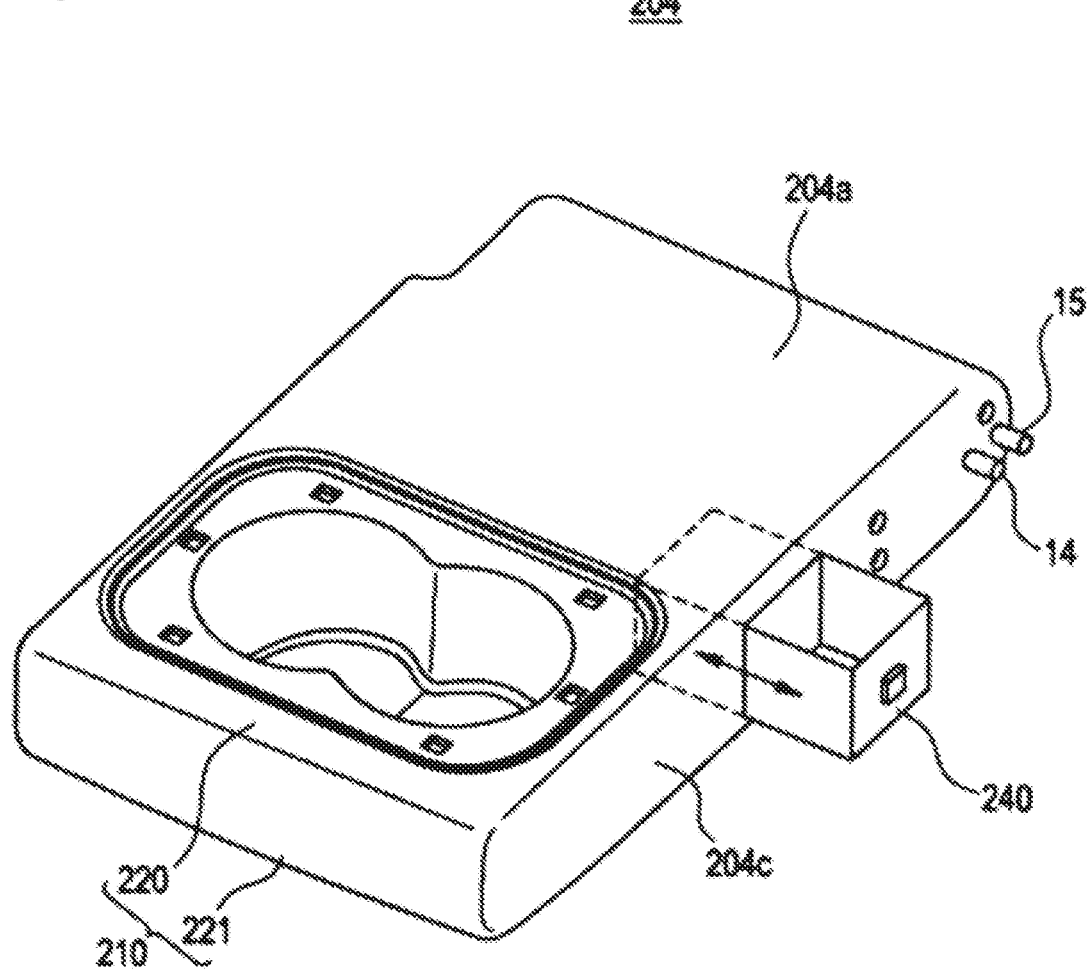
FIG. 9 is a perspective view of an armrest according to still another embodiment of the present invention.

FIG. 9 shows an armrest according to still another embodiment of the present invention.

An armrest 204 shown in FIG. 9 includes a hollow shell 210 made of plastic. Brackets (not shown) each for supporting the pin 14 serving as a rotation shaft of the armrest 204 are joined to one end portion of the shell 210. The shell 210 includes a shell top 220 that has a placement surface 204a on which a forearm of an occupant is to be placed, and a shell bottom 221 that has a back surface on an opposite side of the shell 210 form the placement surface 204a, and the shell top 220 and the shell bottom 221 are in one-piece construction.

The armrest 204 further includes a drawer 240 that is accommodated in the hollow shell 210. The drawer 240 is provided in a side surface 204c other than the placement surface 204a on which a forearm of an occupant is to be placed and the back surface on the opposite side of the shell 210 form the placement surface 204a. The hollow shell 210 allows the armrest 240 to be provided with the drawer 240, thus increasing the convenience of the armrest 204 by providing the drawer 240.

Figure 10:
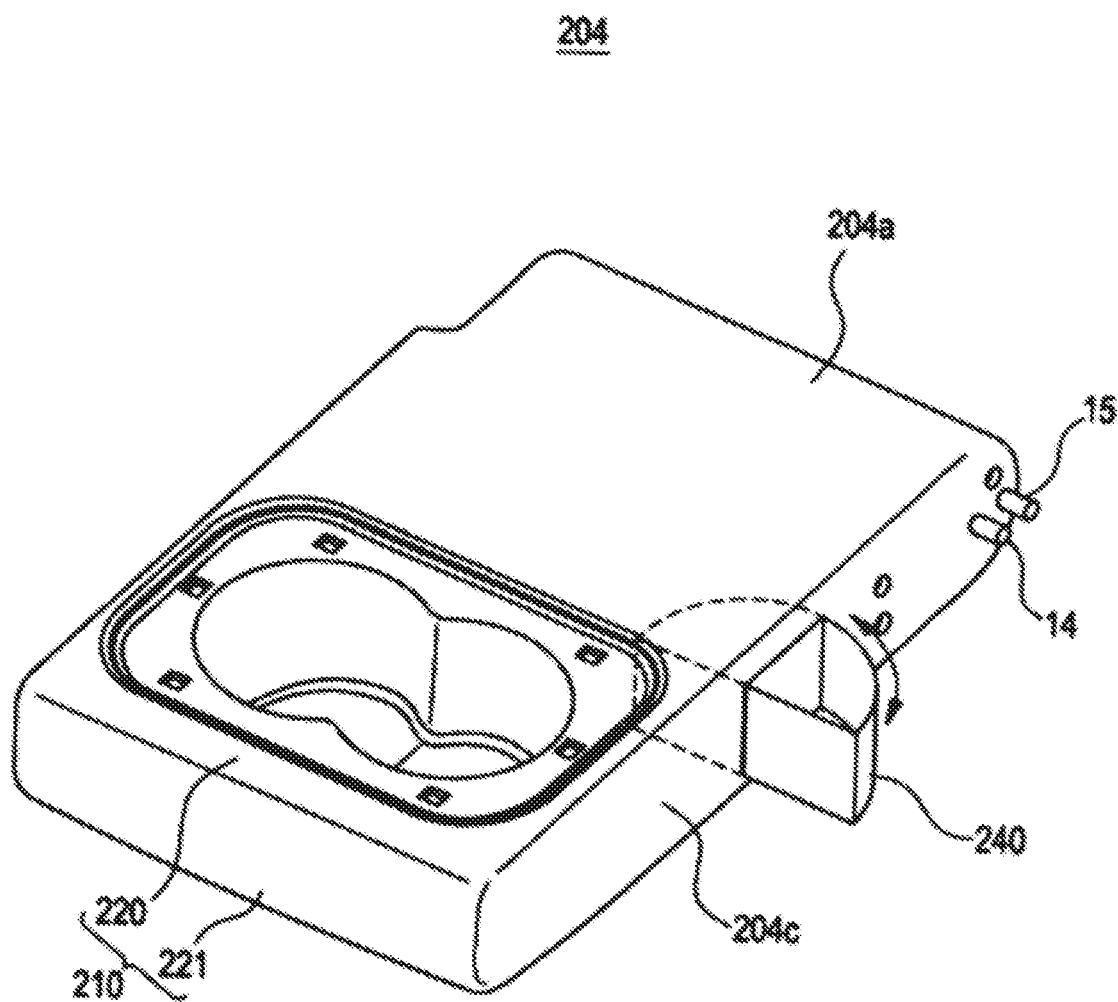
FIG. 10 is a perspective view of an armrest according to still another embodiment of the present invention.

In the example shown in FIG. 9, the drawer 240 is pulled out of the shell 210 by sliding movement, but as shown in FIG. 10, the drawer 240 may be pulled out of the shell 210 by rotational movement.

Although it has been described above that the hollow shell (10, 110, 210) includes the shell top (20, 120, 220) that has the placement surface and the shell bottom (21, 121, 221) that has the back surface, the shell top and the shell bottom are in one-piece construction, but the shell top and the shell bottom may be discrete.

In a case where the shell top and the shell bottom are discrete, the shell top and the shell bottom are formed by injection molding, for example. The bracket that supports the rotation shaft of the armrest may be joined to at least one of the shell bottom and the shell top. Then, the shell top and the shell bottom are connected to each other to form the hollow shell. The shell top and the shell bottom are connected by, for example, adhesive or locking claws.

In the case where the shell top and the shell bottom are discrete, flexibility of the shell top and the shell bottom can also be tuned to be different by making the thicknesses and/or materials of the shell top and the shell bottom different.

Although the present invention has been described above by taking the vehicle seat 1 installed in a vehicle such as an automobile as an example, the present invention can also be applied to a vehicle seat other than a vehicle such as a ship or an aircraft.

As described above, the armrest disclosed in the present specification is an armrest for a vehicle seat that is rotatable with respect to a seat back of the vehicle seat, and the armrest includes a bracket that is configured to support a rotation shaft of the armrest, the hollow plastic shell to which the bracket is joined and a trim cover that covers the hollow plastic shell.

The shell may include the shell top that has the placement surface on which a forearm of an occupant is to be placed, and the shell bottom that has the back surface on an opposite side of the hollow plastic shell form the placement surface, and the shell top and the shell bottom may be in one-piece construction.

The shell may include the shell top that has the placement surface on which a forearm of an occupant is to be placed, and the shell bottom that has the back surface on an opposite side of the hollow plastic shell from the placement surface, and the shell top and the shell bottom may be discrete and connected to each other.

The shell top and the shell bottom may be different in thickness and/or material.

The shell top and the shell bottom may be the same in thickness and/or material.

The armrest may further include a core disposed in the hollow plastic shell.

The armrest may further include the recess-shaped cup holder that opens on the placement surface on which a forearm of an occupant is to be placed, and the hollow plastic shell including the cup holder may have one-piece construction.

The armrest may further include the drawer accommodated in the hollow plastic shell, and the drawer may be provided in a side surface other than the placement surface on which a forearm of an occupant is to be placed and a back surface on the opposite side of the hollow plastic shell from the placement surface.

The vehicle seat disclosed in the present specification includes the armrest described above.

What is claimed is:

1. An armrest for a vehicle seat that is rotatable with respect to a seat back of the vehicle seat, comprising:
    a bracket configured to support a rotation shaft of the armrest;
    a hollow plastic shell, the bracket being joined to the hollow plastic shell; and
    a trim cover covering the hollow plastic shell,
    wherein the hollow plastic shell is formed integrally with the bracket in one-piece by molding.

2. The armrest according to claim 1, wherein the shell includes:
    a shell top having a placement surface on which a forearm of an occupant is to be placed; and
    a shell bottom having a back surface on an opposite side of the hollow plastic shell from the placement surface, and
    the shell top and the shell bottom are in one-piece construction.

3. The armrest according to claim 1, wherein the shell includes:
    a shell top having a placement surface on which a forearm of an occupant is to be placed; and
    a shell bottom having a back surface on an opposite side of the hollow plastic shell from the placement surface, and
    the shell top and the shell bottom are discrete and are connected to each other.

4. The armrest according to claim 2, wherein the shell top and the shell bottom are different in thickness and/or material.

5. The armrest according to claim 2, wherein the shell top and the shell bottom are the same in thickness and/or material.

6. The armrest according to claim 1 further comprising: a core disposed in the hollow plastic shell.

7. The armrest according to claim 1 further comprising:
    a recess-shaped cup holder that opens on a placement surface on which a forearm of an occupant is to be placed,
    wherein the hollow plastic shell including the cup holder has one-piece construction.

8. The armrest according to claim 1 further comprising:
    a drawer accommodated in the hollow plastic shell, the drawer being provided in a side surface other than a placement surface on which a forearm of an occupant is to be placed and a back surface on an opposite side of the hollow plastic shell from the placement surface.

9. A vehicle seat comprising the armrest according to claim 1.

* * * * *